United States Patent
Smothers

(10) Patent No.: US 6,640,455 B1
(45) Date of Patent: Nov. 4, 2003

(54) SLIDING ADJUSTABLE TRACK LEVEL

(76) Inventor: Willam Smothers, 841 Indian Trail, Akron, OH (US) 44314

( * ) Notice: Subject to any disclaimer, the term of this patent is extended or adjusted under 35 U.S.C. 154(b) by 0 days.

(21) Appl. No.: 09/968,113

(22) Filed: Oct. 1, 2001

(51) Int. Cl.[7] ................................................. G01C 9/00
(52) U.S. Cl. ............................. 33/374; 33/365; 33/375
(58) Field of Search ........................... 33/374, 375, 365, 33/451

(56) References Cited

U.S. PATENT DOCUMENTS

| | | | | | |
|---|---|---|---|---|---|
| 2,879,606 | A | * | 3/1959 | Olivere | 33/374 |
| 3,104,477 | A | * | 9/1963 | Edwill | 33/374 |
| 3,811,197 | A | * | 5/1974 | Moore et al. | 33/374 |
| 4,099,331 | A | * | 7/1978 | Peterson et al. | 33/374 |
| 4,152,838 | A | * | 5/1979 | Cook | 33/374 |
| 4,607,437 | A | * | 8/1986 | McSorley et al. | 33/374 |
| 4,894,925 | A | * | 1/1990 | Langmaid | 33/374 |
| 5,155,917 | A | * | 10/1992 | Townsend et al. | 33/374 |
| 5,249,365 | A | * | 10/1993 | Santiago | 33/374 |
| 5,412,875 | A | * | 5/1995 | Hilderbrandt | 33/374 |
| 5,433,011 | A | * | 7/1995 | Scarborough et al. | 33/374 |
| 5,577,327 | A | * | 11/1996 | Archambault | 33/374 |
| 6,041,510 | A | * | 3/2000 | Huff | 33/374 |

* cited by examiner

Primary Examiner—Christopher W. Fulton
Assistant Examiner—Madeline Gonzalez
(74) Attorney, Agent, or Firm—David M. Lowry

(57) ABSTRACT

An extendable carpenter's level which comprises a pair of extending body members capable of adapting and mounting upon the standard "I" level frame configuration of a carpenter's level by sliding said extendable body members onto the frame of the standard level. Each extending body member consists of a top and bottom slide extension rigidly attached to one another so as to be firmly in contact with the level frame. The top and bottom slide he extensions each incorporate a lock pin to insure rigidity as against the level frame and stop clips to eliminate outward extension of the extending body members beyond the end of the level frame. In another embodiment, each extending body member is split such that both the top and bottom slide extensions comprise generally a right and left side extension held together by means of slide springs and flush mounted screws. The tightening or loosening of the flush mounts enable the top and bottom slide extensions and therefore the extending body members to be sized to nearly any size. The device creates the opportunity to expand a conventional level to nearly any desired length or, when contracted, to the size of the standard level.

2 Claims, 3 Drawing Sheets

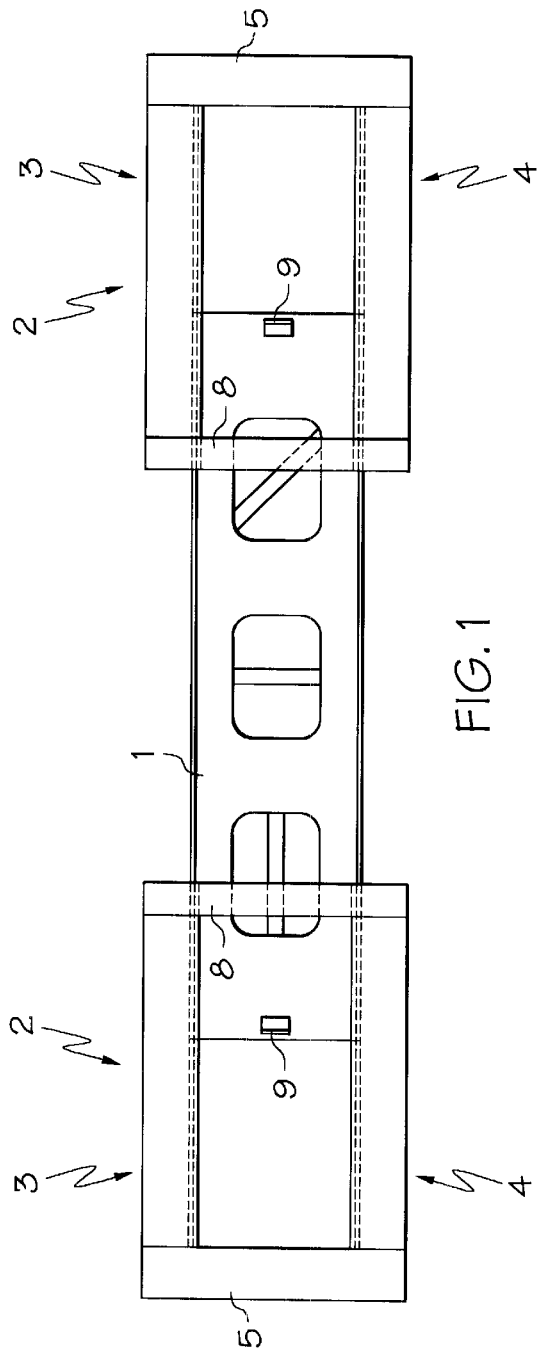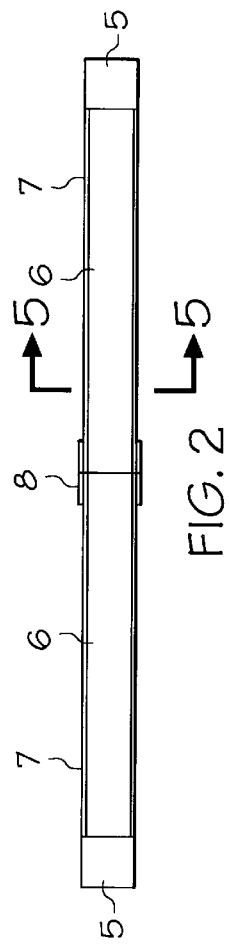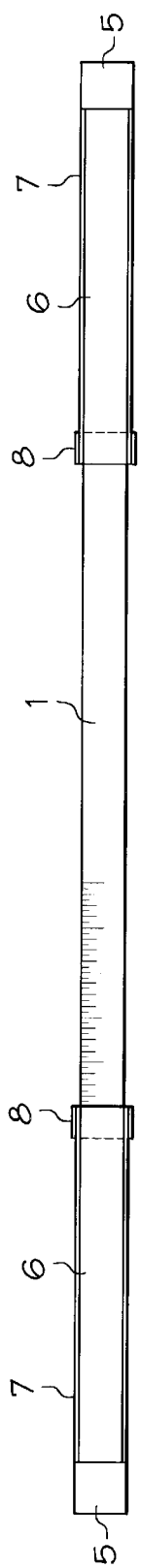

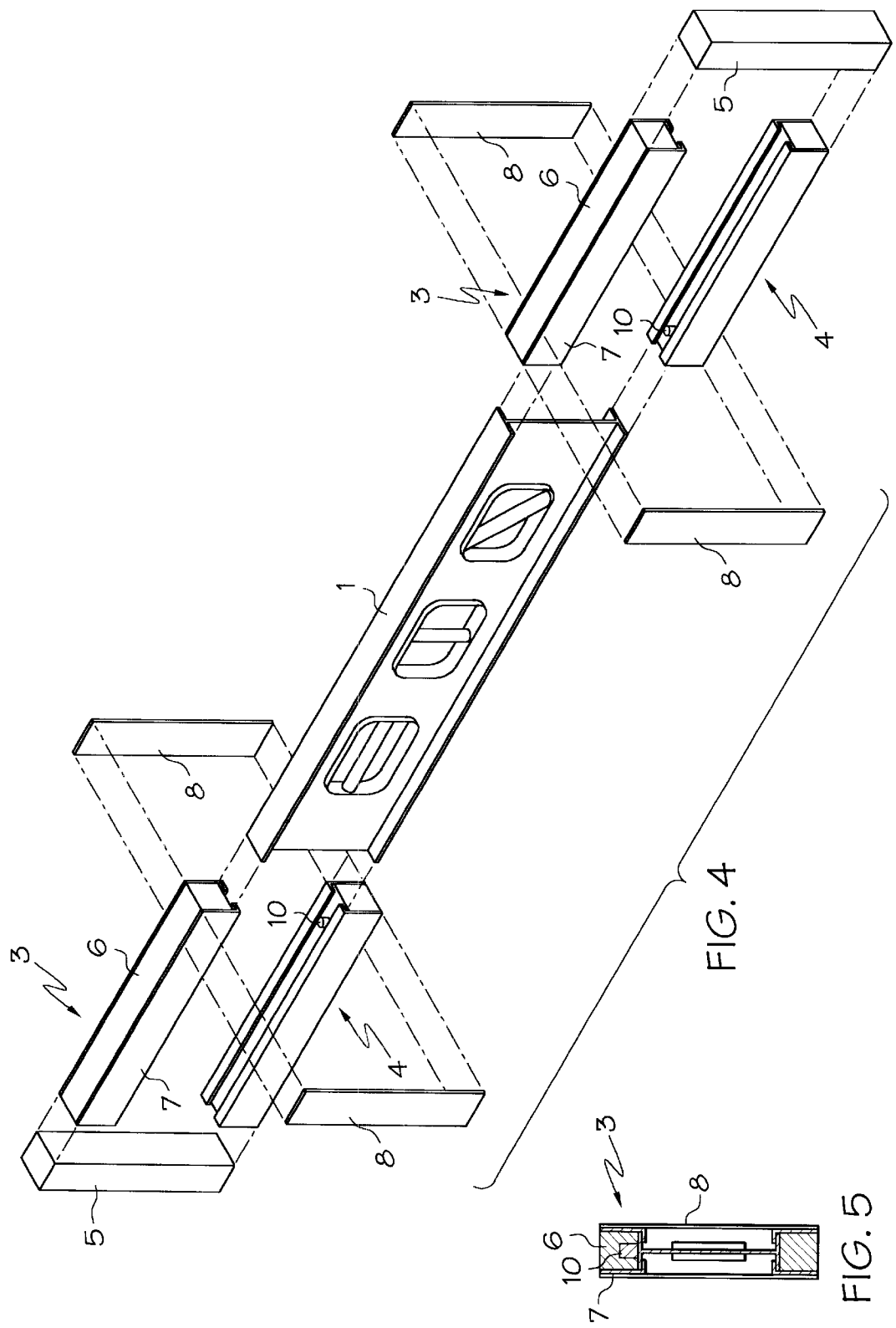

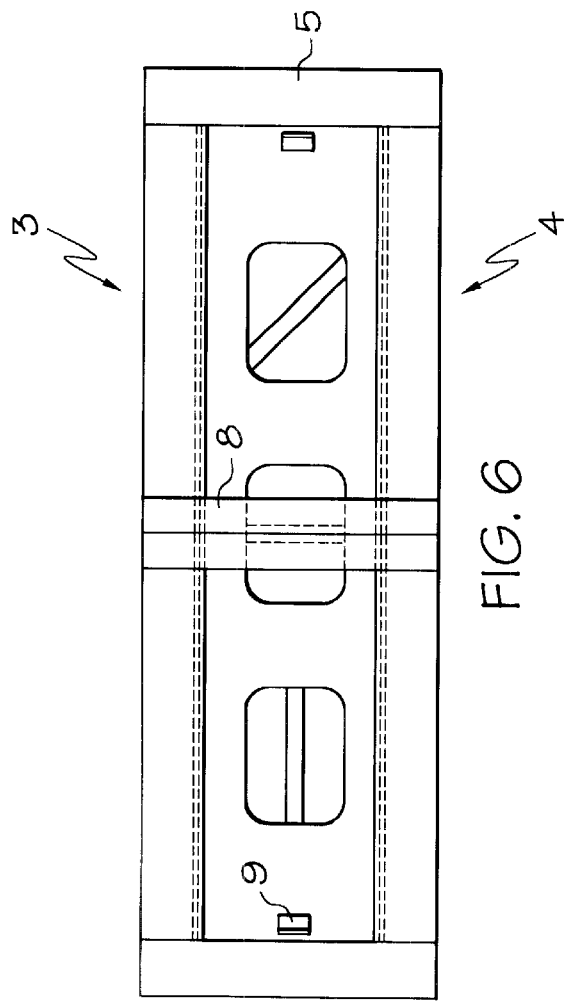
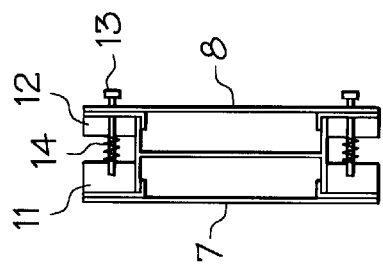
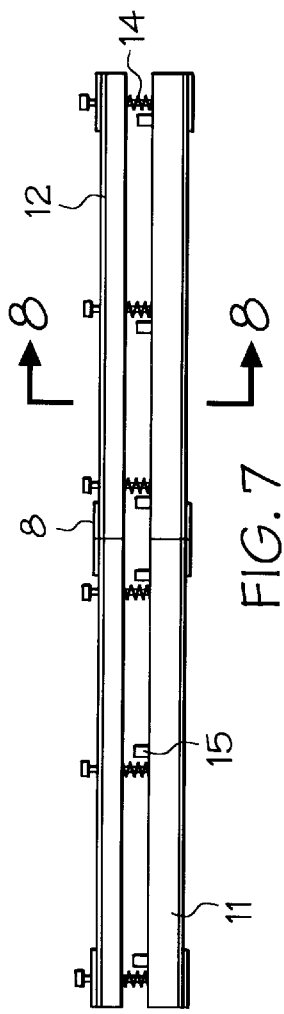

SLIDING ADJUSTABLE TRACK LEVEL

BACKGROUND OF THE INVENTION

In the business of carpentry, the carpenter's level is a standard and necessary tool. The level is used for a plurality of functions and, often, varying sizes of level are needed due to work space configurations or size constraints. It is not uncommon for a carpenter to carry, or be required to carry, numerous different types of level depending on these constraints and the size of the appropriate work piece involved. The instant invention is intended to solve the necessity of purchasing and maintaining numerous levels of varying size and degree. It does so in a unique manner which obviates numerous problems and limitations of the prior art.

This device provides the means of acquiring an indefinitely adjustable length level by means of incorporating a pair of extending body members placed integral with a standard level that extend outwardly from the central portion of an existing carpenter's level.

As recognized through common knowledge and the prior art, one of the principal impediments to the construction of an expandable level involves instability when the expanding portions are slid along the body of the level frame. This particularly in the outwardly most positions. Unless the expanding members are strongly biased as against the level, there exists the distinct possibility of realizing a "wobbling" condition hindering accuracy. This is one of the issues principally addressed in the instant invention. The extending body members are configured so as to slide on the frame of a manufactured level. The nature of the sliding mechanism is such that it insures stability and rigidity of the extending body members throughout the slidable range including the outwardly most position. A further benefit of the means of realizing the sliding capability is that it enables the extending body members to be pulled off the level for use upon a different level with relative ease as to any "I" configured level purchased in the retail setting.

It is an additional object of this specific invention to provide an expandable level that is rigid in all increments from a collapsed position up through, and including, the maximum extension of the expandable arms.

It is also another distinct and absolute object to provide readily removable extension arms for transfer or placement upon any level of similar configuration. As differently manufactured levels may have distinct shapes of level frames, it is evident that a rigid configuration of the sliding mechanism with fixed spacing would destroy adaptability onto certain levels. It is an important feature of this invention to remedy this problem. This is accomplished by means of adjustable top and bottom slide extenders that are capable of being expanded or tightened in an axis perpendicular to the frame of the level in order to accommodate all sizes of level frames provided by various manufacturers.

These and other objects will become relatively apparent when referencing the drawings and figures accompanying this Application and the descriptions associated therewith.

DESCRIPTION OF DRAWINGS

FIG. 1 is a side view of the device of this invention showing the extending body members in a position approximately one-half of the available extension.

FIG. 2 is a top view of the device of this invention with the extending body members fully collapsed.

FIG. 3 is a top view of the device with the extending body members in a fully expanded position.

FIG. 4 is an exploded view of the device of this invention illustrating the configuration of the various parts comprising the invention.

FIG. 5 is a cross-sectional view through the level as shown in FIG. 2 demonstrating the standard "I" configuration level frame member as well as the slidable extending body members of the claimed invention.

FIG. 6 is also a side view of the invention with the extending body members in a fully collapsed position demonstrating the position and location of the stop clips.

FIG. 7 is a top view of the device and the right and left side extensions of the split extending body members of a preferred embodiment showing the device capable of attachment to any sized level frame member.

FIG. 8 is a detailed cross-sectional view of the device of FIG. 7 showing the necessary components of the invention used to create the universally applicable sliding member.

DETAILED DESCRIPTIONS OF THE DRAWING AND PREFERRED EMBODIMENTS

FIG. 1 is a side view of the invention demonstrating a significant portion of all the components comprising the device. Initially, an "I" configuration standard level 1 is shown. Thereafter, one can readily observe the extending body member 2 located at each end of level 1. Each extending body member 2 comprises generally a top slide extension 3 and a bottom slide extension 4. The aforesaid extensions are attached by means of end piece 5 and support member 8. The composition of the slide extensions is evidenced by FIG. 5. In FIG. 5, it is shown that top slide extension 3 is comprised of a medially located frame member 6 with an "I" shaped slide bracket 7 affixed thereto. Slide bracket 7 is attached to frame member 6 so there is a space between a portion of slide bracket 7 and frame member 6 large enough to enable insertion onto the level for subsequent closure and retraction. Likewise, bottom slide extension 4 is similarly comprised of frame member 6 with associated slide bracket 7 in similar spatial arrangement.

FIG. 1 further shows support member 8 utilized to provide rigidity and support for respective extending body members 2 in both the closed and extended position.

FIG. 2 is a top view of the device in its fully collapsed position. One can see frame member 6 with slide bracket 7 firmly affixed thereto. End piece 5 is also seen which operates as an end piece for the unit and to provide rigidity and support. End piece 5 replaces the terminating piece of a standardized level and may be used for leveling in certain circumstances. Finally, support member 8 is visible in its relationship to slide bracket 7.

FIG. 3 is essentially the view of FIG. 2 except the extending body members 2 are shown in their outward most position. One sees fully the items addressed and described in FIG. 2 and the position of the frame of the level 1. In this particular view, one may also see the markings on level 1 used for measurement. One may also place graduations on extending body members 2 to enable measurement in any expanded position. These graduations, however, are not depicted in this particular drawing.

FIG. 4 is an exploded view of the device showing the relationship of the components comprising extending body member 2 consisting of top slide extension 3, bottom slide extension 4, frame members 6, sliding brackets 7, end pieces 5, and support members 8. This Figure also shows another ingredient of this device intended to resolve one of the principal problem areas of the prior art as noted above.

Specifically, the situation resulting from inadequate biasing against the existing carpenter level. As above described, wobble in the unit is of real concern. Here, locking pins 10 address this situation. They are placed integral with frame member 6 in such position as to contact the body of the level frame as it is inserted onto extending body members 2. Locking pins 10 are strongly biased against level 1 thereby reducing wobble and eliminating any looseness in the physical arrangement between slide members 7, frame members 6, and the standardized level. FIG. 5 is a drawing showing a cross-sectional view of the device along the line of FIG. 2 wherein slide member 7 is shown. Here, once again, one easily sees the standardized "I" level configuration with the attachment of top slide extension 3 and bottom slide extension 4. The relationship as between frame member 6, slide bracket 7, support member 8, and locking pin 10 is demonstrated.

FIG. 6 is a side view showing the various elements of this invention. It also shows stop clips 9. Stop clips 9 address the situation of terminating extension of extending body members 2 at a point prior to disengaging from level 1. They also are placed in a position such that there remains sufficient contact with the level "I" frame member and slide brackets 7 to eliminate "wobble" and false level readings. These stop clips 9 are affixed to the frame of level 1 as indicated in this particular drawing by any means including screw, adhesive, or other mechanical means.

In one preferred version of this invention, one may easily visualize extending body members 2 being placed upon level 1 containing an "I" shaped configuration. Once placed thereon, stop clips 9 should be affixed to the side of the level frame. Thereafter, extending body members 2 are capable of being collapsed inwardly to achieve what would essentially be the length and size of level 1 plus the relative thickness of end pieces 5. Any graduations upon extending body members 2 would provide ease and simplicity of measurement along the axis of the device. Should one desire a device requiring an expanded level, extending body members 2 are simply pulled apart. Extending body members 2 are not restricted in their slidable ability as to one another, they either may both be slid outward or one of them alone may be slid in an outward relationship in order to obtain any desired length of expandable level. Any graduation is capable of achievement and at its maximum extension, stop clips 9 terminate extension prior to extending body members 2 disengaging from the frame of level 1.

Due to the ease and simplicity of operation, coupled with the rigidity achieved by a sliding mechanism, extending body members 2 are capable of being removed from one level for placement upon another level at the whim of anyone skilled in the art of carpentry.

FIG. 7 shows another preferred embodiment of this device. As previously indicated, the "I" configuration of certain levels is particular to the manufacturer of the level. In other words, the level arms sometimes extend at different lengths from the frame body depending on the manufacturer's particular design. As seen, the device of FIGS. 1 through 6, would necessitate a standardized fixed relationship as between the distance of extension from the frame body of the particular level. The device of FIG. 7 is intended to overcome this obstacle. FIG. 7 shows a view of the top of this particular aspect of the invention. Top slide extension 3 has been split into two separate pieces. This comprising generally right side extension 11 and left side extension 12. Right side extension 11 and left side extension 12 are attached by means of a series of flush mounts 13. Flush mounts 13 extend from left side extension 12 through right side extension 11. The portion of flush mounts 13 as between the side extensions is encapsulated by several slide springs 14. Slide springs 14 force right side extension 11 and left side extension 12 in an outwardly biased position. Further, this drawing depicts various doll members 15 affixed to right side extension 11. Upon the tightening of flush mounts 13, the side extensions travel inwardly thereby engaging doll members 15 into left side extension 12 receptacles. Doll members 15 are important in that they address one particular problem with the prior art as previously indicated. That being the necessity to maintain strength and rigidity in order to maintain the integrity of the leveling unit and accuracy of the level 1 with extending body members 2 attached to level 1.

This FIG. 7 also clearly depicts the method by which extending body members 2 are split into two distinct pieces. It is noted the right side extension 11 is wider than left side extension 12. There is an important reason for this differentiation in width. Particularly, the majority of rigidity and strength is accomplished through the width variance of right side member 11. It encompasses and touches a majority of the level frame and, therefore, is the principal means of obtaining structural support. Flush mounts 13, when coupled with doll members 15, then securely and absolutely place right side extension 11 in conjunction with the level frame and achieve desired rigidity and strength.

FIG. 8 is an expanded end view of FIG. 7 and demonstrates all of the principle ingredients of that item.

What I claim is:

1. An extendable carpenter's level capable of extension between a collapsed position and a fully extended position comprising:

a. a generic carpenter's level containing an "I" level frame configuration in cross section with the outwardly extending portion of said "I" being a pair of rails on each side of the level; and, b. first and second extending body members each consisting of a top slide extension and a bottom slide extension comprised of frame members connected by end pieces and support members and further defined by "L" shaped slide brackets affixed to the frame members in such a configuration to create a space between a portion of the slide bracket and the frame member; and c. both top slide extension and bottom slide extension of the first and second extending body members split so as to be comprised of a right side extension and a left side extension each having a plurality of flush mounts extending from the left side extension into the right side extension with the portion of the flush mounts between said right and left side extensions being encapsulated by slide springs thereby forcing the side extensions to be outwardly biased such that tightening or loosening of the flush mounts enables the first and second extending body member to be slidably placed by means of the slide brackets upon the rails at opposed ends of a carpenter's level with any "I" frame size or configuration.

2. The apparatus of claim 1, wherein the right side extension contains a plurality of doll members which, upon tightening of the flush mounts, engage with oppositely located receptacles in the left side extension thereby adding strength and rigidity to the top slide extension and bottom slide extension as they traverse the entire range of movement on the level frame from collapsed to fully extended.

* * * * *